March 17, 1970     D. M. GRAY     3,500,857

VALVE CONSTRUCTION

Filed Oct. 27, 1967

INVENTOR
DONALD M. GRAY

BY

ATTORNEYS

United States Patent Office 3,500,857
Patented Mar. 17, 1970

1

3,500,857
VALVE CONSTRUCTION
Donald M. Gray, Kingston, N.Y., assignor to W. G. B.
Oil Clarifier, Inc., Kingston, N.Y., a corporation of
New York
Filed Oct. 27, 1967, Ser. No. 678,557
Int. Cl. F01d 27/08; F16k 17/04; F01m 1/10
U.S. Cl. 137—516.25                    4 Claims

ABSTRACT OF THE DISCLOSURE

An inlet valve for an oil filter having a guide member on the downstream side of the valve member which directs the oil flow around the valve member during operation so as to maintain the valve member in position to avoid valve chattering.

BACKGROUND OF THE INVENTION

This invention relates generally on one-way or check valves and more specifically to an inlet valve for an oil filter of the replaceable cartridge type used with internal combustion engines.

Prior valve constructions of the indicated type are disclosed in U.S. Patents Nos. 3,167,507 and 3,233,738. These prior constructions comprise an inlet check valve assembly mounted at the lower end of a vertically mounted filter body and operable to permit flow into the filter but to prevent flow out of the filter. The inlet valve assembly comprises a valve member which is biased to a closed position so as to prevent flow from the filter when the pressure developed by the inlet flow during normal operation is terminated. This function of holding the oil within the filter is important to this type of filter since it is essential that when filtration is resumed, the filter body is filled with oil. This is in accordance with well-known procedures. During a filtering operation, the oil flows through the inlet valve into an inlet chamber from which the oil flows through the filtering elements and to an outlet valve which discharges the oil from the filter.

While the inlet valves of the prior art are satisfactory under many operating conditions, it was found that under conditions of high pressure and high flow rates, chattering would occur, i.e. the valve member would beat against the valve seat. This valve chattering results in wearing of both the valve member and the valve seat and, as a result of this wear, the inlet valve would permit leakage of oil from the interior of the filter past the valve.

SUMMARY OF THE INVENTION

The valve construction in accordance with the invention overcomes the above-discussed problems of the prior art inlet check valves under high pressure operating conditions by the provision of a baffle guide located downstream of the valve seat and constructed to define a flow chamber extending around the valve member so as to direct fluid flow evenly past the valve member throughout the circumference thereof as the valve member moves away from the valve seat to an open position. By reason of the even flow around the valve member is maintained in a central position and, accordingly, the valve member will not beat against the valve seat even during high pressure and high flow rate operating conditions.

More specifically, the baffle guide arrangement comprises means defining a cylindrical wall concentric with the axis of the valve seat and extending in a downstream direction from the valve seat to encircle the valve member as it moves away from the valve seat to an open position.

2

DESCRIPTION OF THE PREFERRED EMBODIMENT

Figure 1:
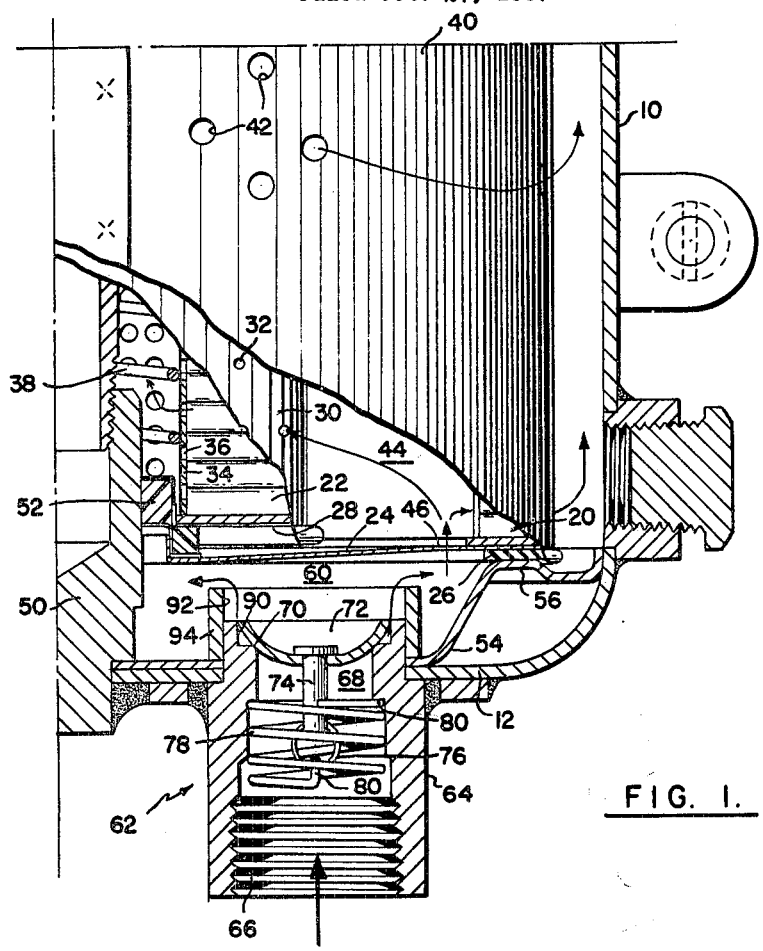
FIGURE 1 is a fragmentary sectional view of a portion of an oil filter provided with the inlet check valve in accordance with the invention.

The valve construction in accordance with the invention is shown in FIGURE 1 as it is adapted for use as an inlet check valve for an oil filter. The filter comprises a housing generally indicated at 10, having a bottom end portion 12. The filter is of the type disclosed in said prior-mentioned patents and is essentially the same as that disclosed in the copending application of Donald M. Gray, Hollis M. Burhans and Wendell H. Gray Ser. No. 673,-347, filed Oct. 6, 1967.

Within the filter housing 10 is a replaceable filter cartridge unit comprising an outer annular filter element 20 and an inner annular filter element 22. At the lower end of the filter cartridge unit there is provided a cover 24 which encloses the lower end of the cartridge. Adhesively secured to the cover 24 is a flat annular gasket 26. Each of the filter elements 20 and 22 comprises a pleated filter paper element. At its lower end, the inner filter element 22 comprises a cover 28 secured at its outer end to a metallic outer cylinder 30. The cylinder 30 is provided with holes 32 throughout the surface thereof. Positioned within the inner filter element 22 is a thin center tube 34 having a plurality of holes 36 throughout the surface thereof. Positioned within the center tube 34 is a center spring 38 which serves to reinforce the inner filter element against the pressures developed during filtering.

The outer filter element also comprises a metallic outer cylinder 40 provided with holes 42 throughout the surface thereof. It will be noted that an annular chamber 44 is formed by the space between the inner and outer filter elements. A plurality of openings 46 are formed in a cover 24 and are spaced circumferentially about the cover 24 to communicate with the lower end of the annular chamber 44.

The inner and outer filter elements are secured together to form a dual flow cartridge. The two covers 24 and 28 are secured at their outer ends to the cylinders 40 and 30, respectively. The inner filter element 22 is incorporated concentrically within the outer filter element 20 in a secured position and to provide an effective seal to prevent the flow of oil around the ends of the inner filter 22 into the interior of tube 34. The novel aspects of this construction are covered in said prior-mentioned application. Briefly stated, the covers are secured at their inner ends in a manner to position the filter elements concentrically with respect to one another.

Positioned within the filter is means for mounting the filter cartridge unit at its lower end. This means comprises a support post 50 extending through the bottom wall 12 and fixed thereto as by welding. The upper end portion of the post 50 extends through the central opening in an annular gasket 52 as is discussed more fully in said prior-mentioned application. Fitted over the post 50 is a dished plate 54 secured in position by being held between a shoulder on the post 50 and the bottom wall 12 of the housing. The plate 54 is provided with a raised, flat annular rim 56 upon which the gasket 26 is seated.

It will be noted that a chamber 60 is formed by the space enclosed between the plate 54 and the overlying cover 24. This chamber 60 may be termed an inlet chamber and is adapted to receive the flow from the inlet valve assembly as will be discussed more fully herein.

The above-described construction is essentially the same as the filter described more fully in said prior-mentioned application.

The inlet valve assembly for the filter is generally indicated at 62 and functions as a check valve which permits flow through the valve in a direction into the filter and blocks any flow out of the filter. The inlet valve assembly 62 comprises a body 64 which is secured to the bottom wall 12 of the filter housing 10 by welding and extends through this lower wall and through the plate 54 into the inlet chamber 60. The lower end portion of the valve body is threaded internally at 66 for connection to the usual supply line through which oil is pumped into the filter under pressure.

The body 64 defines a generally cylindrical inlet passageway 68 which terminates at an annular valve seat 70 formed on the body 64. A valve member 72 comprising a disc having a spherical wall portion is mounted to cooperate with the valve seat 70 which is provided with a spherical configuration adapted to conform to the spherical portion of the valve member 72. Means are provided to mount the valve member 72 for movement toward and away from the valve seat 70 while maintaining a bias on the valve member 72 towards its closed position in contact with the valve seat 70. Such means comprises a clevis pin 74 which is secured by a press fit within the valve disc as shown in FIGURE 1 and extends through the valve disc from a head portion of the pin into the inlet passage 68. The pin 74 is provided with a transversely extending hole which has a circular ring 76 secured therein. A coil spring 78 is mounted with one end in contact with a shoulder 80 formed on the body 64 and has a loop portion 80 at its other end in engagement with the ring 76. The spring 78 is mounted in compression so that it biases the pin 74, and accordingly the valve member 72, in a downward direction whereby the valve member 72 is normally in its closed position with the spherical portion thereof in contact with the valve seat 70. Accordingly, the valve member 72 will assume the closed position, as shown in FIGURE 1 when no oil is being pumped into the filter by way of the inlet passage 68.

Means are provided for guiding the valve member 72 to open positions in response to the flow of oil through the inlet valve assembly such that the valve member 72 will not beat against the valve seat 70 during this operating condition. Such means comprises a baffle guide arrangement comprising a first cylindrical wall 90 having a diameter larger than that of the valve seat 70 and extending axially in a downstream direction from the valve seat 70. Such means also comprises a second cylindrical wall 92 having a diameter larger than the first cylindrical wall 90 and extending axially downstream from said first cylindrical wall 90.

The first cylindrical wall 90 is formed on the body 64 while the second cylindrical wall 92 is formed by a tubular member 94 mounted on the downstream end of the body 64 as is best shown in FIGURE 1. Both walls 90 and 92 are concentric with valve seat 70.

The manner in which the baffle guide construction serves to prevent the wearing of the valve by reason of chattering will be described with particular reference to FIGURES 2 and 3 wherein the arrows illustrate the flow pattern of the oil as it passes through the inlet valve assembly during a low flow and a high flow condition, respectively.

Figure 2:
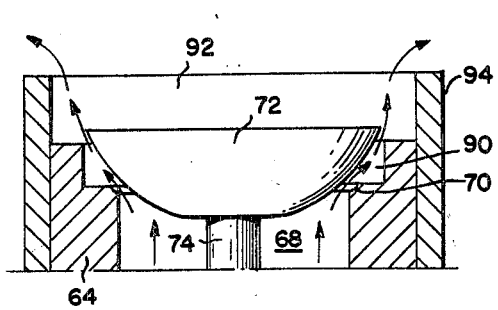
FIGURE 2 is an enlarged view of the valve assembly in accordance with the invention showing the valve member in a partially open position.

Referring to FIGURE 2, it will be noted that during a low flow condition, the cylindrical wall 90 extending around the valve member 72 serves to confine the oil flow close to the valve member 72. Moreover, this oil flow is confined to be distributed evenly throughout the circumferential extent of the valve member 72. Thus, the flowing oil serves as a cushion at this low flow condition to maintain the valve member 72 off the valve seat to avoid any beating action. Moreover, by reason of the even oil flow throughout the circumferential extent of the valve member, the valve member 72 is maintained in a central position and thus will not move laterally to beat against the valve seat 70. The arrows in this figure illustrate the flow pattern of the oil as it flows past the valve member 72.

Figure 3:
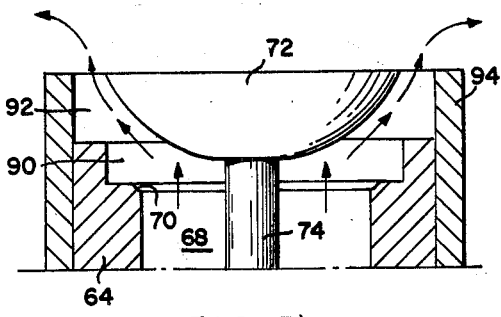
FIGURE 3 is an enlarged view of the valve assembly in accordance with the inventon showing the valve member in a fully open position.

In the high flow operating condition shown in FIGURE 3, it is the upper cylindrical wall 92 which serves to provide a chamber enclosing the valve member 72 in its operating position to thereby confine the flow of oil around the valve member so that this flow is distributed evenly throughout the circumferential extent. By reason of this even distribution of the oil, the valve member 72 will be maintained in its central position. Accordingly, when the oil pressure is reduced and the valve member 72 will return to its closed position, it will not be in a laterally displaced position and thus will not come into contact with the valve seat 70 in an eccentric position which would cause an uneven contact of the valve member 72 with the valve seat 70 and thus produce a wearing condition.

An important advantage of the valve guide arrangement in accordance with the invention is that it achieves the guidance of a valve without the need of any mechanical guide means. Various mechanical guides for valves to maintain the valve in its central position are well known. However, for many applications, such as in oil filters where the oil is dirty, these mechanical guides become clogged and thus retard the opening and closing movement of the valve. However, with applicant's baffle guide arrangement this problem is avoided.

Applicant's valve guide is also particularly useful in applications, such as oil filters of the type described, wherein the chamber into which the oil is delivered is of a confined and non-symmertical arrangement. For example, in the oil filter shown in FIGURE 1, the inlet chamber 60 is defined by a wall, provided by cover 24, which extends close to and transversely across the delivery and of the inlet valve assembly 62. When the chamber into which the oil is delivered is of such a nature, there is a tendency to create turbulent flow and uneven flow distribution results. However, by applicant's baffle guide arrangement, the oil flow in the region of the valve member is positively controlled to achieve an even distribution of flow around the valve member. Accordingly, the problems of turbulent and uneven flow in the downstream portion of the valve assembly are avoided.

It will be noted that the configuration of the baffle guide walls will vary with the particular application thereof. Thus, the relative dimensions shown in the drawings are illustrative for one operating condition of filter construction. The configuration of the baffle guide walls can be determined empirically for a particular application. It may be noted that the best test of whether or not the configuration is proper is to operate the filter under conditions simulating those under actual usage, and then examine the valve assembly to determine whether or not any wear is produced.

It will be noted however, one dimensional aspect that should be employed is to make the flow area of the inlet passageway 68 equal to the flow area between the valve member 72 and the wall 92 at the maximum flow condition of the valve.

It will be apparent that the invention is not to be limited except as required by the following claims and the above description is by way of illustration only.

I claim:

1. A one-way valve assembly for controlling the flow of liquid from a pressure source to a confined chamber comprising means providing an inlet passage for receiving the flow of liquid from the source, means providing an annular valve seat region at the downstream end of said inlet passage and including a valve seat, a valve member cooperable with said valve seat to block liquid flow therepast when the valve member is in a closed position in contact with said valve seat, means mounting said valve member for movement from said closed position away from said valve seat region in a downstream direction in response to the pressure of liquid flowing into said inlet passage to permit the flow of liquid from said inlet passage past said valve seat and around said valve member to the confined chamber, said mounting means comprising means biasing said valve member toward the closed position, the action of the biasing means being overcome by the pressure of the fluid passing into said inlet passage, and flow guide means located axially downstream of said valve seat region for confining the flow of liquid around said valve member as it moves toward or away from said valve seat to direct the flow of liquid around said valve member uniformly so as to maintain said valve member in a central position as it moves toward an open position and back to the closed position.

2. A valve assembly according to claim 1 wherein said flow guide means comprises means defining a first cylindrical wall concentric with the longitudinal axis of said valve seat and extending downstream from said valve seat region to encircle said valve member in its initial movement away from said valve seat, said cylindrical wall having a diameter greater than the outer diameter of said valve member so that said valve member may move into and out of contact with said valve seat without contacting said cylindrical wall by reason of said confined liquid flow around said valve member.

3. A valve assembly according to claim 2 wherein said flow guide means comprises a second cylindrical wall concentric with the longitudinal axis of said valve seat and having a diameter larger than the diameter of said first cylindrical wall, said second cylindrical wall extending axially downstream from said first cylindrical wall to encircle said valve member in its further movement away from said valve seat region.

4. A valve assembly according to claim 3 including means for mounting the inlet valve assembly in the housing of an oil filter for controlling the flow of oil into said filter, said confined chamber being located within said filter housing and being defined at least partially by a wall extending transversely to the axis of said valve seat, said wall extending close to the end of said second cylindrical wall whereby there is a tendency to create turbulent flow of the oil as it is delivered from said inlet valve assembly into said confined inlet chamber within the filter housing and wherein said valve member comprises a generally disc-shaped configuration, said valve member mounting means includes means restricting rotation of said valve member, and the cross-sectional flow area of said inlet passage approximates the cross-sectional flow area between said valve member and said second cylindrical wall.

References Cited

UNITED STATES PATENTS

| | | | |
|---|---|---|---|
| 3,077,896 | 2/1963 | Weingard | 137—516.25 |
| 3,167,507 | 1/1965 | Burhans et al. | 210—117 |

HENRY S. JAUDON, Primary Examiner

U.S. Cl. X.R.

210—117